June 12, 1945. M. R. WALLACE 2,377,983
SMOKER'S PIPE
Filed June 24, 1943
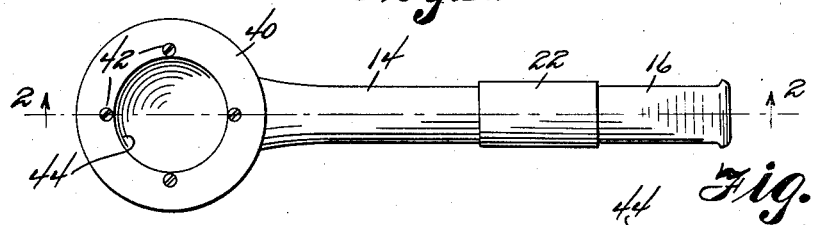
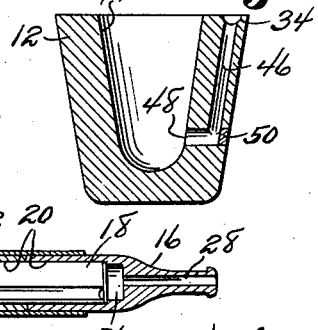
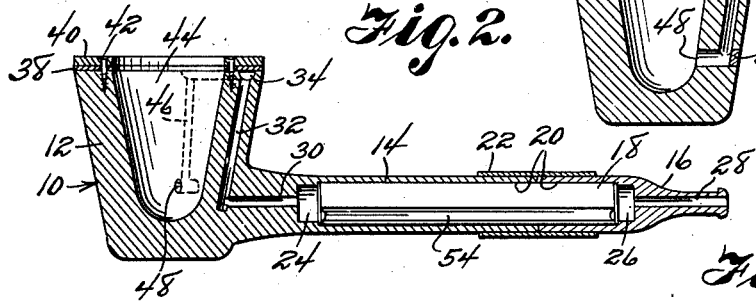
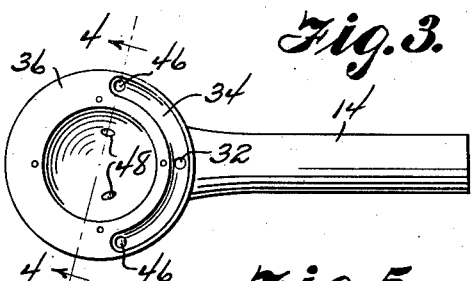
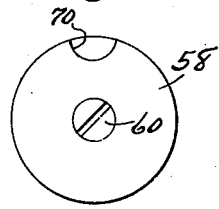
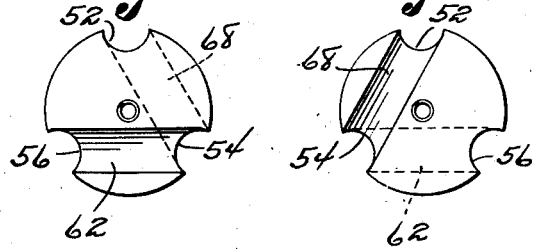
Mac R. Wallace
INVENTOR.
BY
Victor J. Evans & Co.
ATTORNEYS Patented June 12, 1945

2,377,983

UNITED STATES PATENT OFFICE 2,377,983

SMOKER'S PIPE

Mac R. Wallace, Winchester, Mass.

Application June 24, 1943, Serial No. 492,066

1 Claim. (Cl. 131—218)

My invention relates to smokers' pipes, and has among its objects and advantages the provision of an improved air circulating pipe so designed as to provide a cooler smoke, and one in which the smoke conduit is of relatively great length but so arranged that the pipe design need not depart materially from conventional pipes with respect to size and general contour.

In the accompanying drawing:

Figure 1 is a top plan view of a pipe in accordance with my invention.

Figure 2 is a sectional view along the line 2—2 of Figure 1.

Figure 3 is a top plan view of the bowl part with a portion detached therefrom.

Figure 4 is a sectional view along the line 4—4 of Figure 3.

Figure 5 is a partial sectional view of an insert for the stem, which insert is so devised as to provide a relatively long smoke circulating passage in a relatively short stem for coaction with the increased smoke passage in the bowl part of the pipe.

Figure 6 is a bowl end view of the insert.

Figure 7 is a view of the other end of the insert.

Figure 8 is a bowl end view of the body of the insert with a cover cap removed, and Figure 9 is a similar view of the other end of the insert.

In the embodiment of the invention selected for illustration, the pipe 10 includes a bowl 12 and a stem 14. A mouthpiece 16 is detachably connected with the stem 14 by an insert 18 which fits snugly in coaxial bores 20 in the stem and the mouthpiece. A sleeve 22 fits snugly about the stem and the mouthpiece for sealing purposes.

The bores 20 terminate in reduced diameters at their ends to provide chambers 24 and 26 in the stem 14 and the mouthpiece 16, respectively. The chamber 26 has communication with a smoke passage 28 in the mouthpiece 16, while the chamber 24 communicates with a smoke passage 30 in the stem 14 and leading into a vertical smoke passage 32 in the wall of the bowl 12. The smoke passage 32 communicates with a groove 34 in the end face 36 of the bowl. This groove is closed by a sealing gasket 38 and a washer 40 clamped against the sealing washer by screws 42 extending through both the washer and the gasket and threaded into the bowl 12.

Communication is established between the groove 34 and the tobacco cavity 44 by vertical bores 46 in the wall of the bowl 12. The bores 46 are located at the ends of the groove 34 and the passage 32 is located intermediate the ends of the groove. Ports 48 place the lower ends of the passages 46 in communication with the cavity 44. These ports are preferably drilled entirely through the wall of the bowl 12 and then plugged at their outer ends, as at 50 in Figure 4.

The ports 48 are located near the bottom of the cavity 44, and the passages 46, 34, 32 and 30 are so arranged as to total a considerable length for smoke cooling purposes.

To further increase the length of the smoke circulating passage, the insert 18 is provided with three longitudinal grooves 52, 54 and 56. A disk 58 is attached to the bowl end of the insert 18 by a screw 60 to provide a cover for a groove 62 extending across one end of the insert 18 and placing the grooves 54 and 56 in communication with each other. A similar disk 64 is attached to the mouthpiece end of the insert 18 by a screw 66. This disk provides a cover for a groove 68 extending across the mouthpiece end of the insert 18. This groove places the groove 52 in communication with the groove 54.

The disks 58 and 64 are of the same diameter as the insert 18. A notch 70 is provided in the disk 58 to place the groove 52 in communication with the chamber 24. A similar notch 72 is provided in the disk 64 to place the chamber 26 in communication with the groove 56. Thus the smoke is caused to circulate three times lengthwise of the insert 18 to lend additional length to the smoke cooling passage.

While the insert 18 fits snugly in the bores 20, the insert may be easily removed by detaching the mouthpiece 16. The insert 18 will project sufficiently far from the stem 14 to permit a good grip to be had on the insert.

Without further elaboration, the foregoing will so fully explain my invention, that others may, by applying current knowledge, readily adapt the same for use under various conditions of service.

I claim:

In a smoker's pipe, a bowl having a stem, a mouthpiece connected to the stem, the stem and mouthpiece being provided with chambers communicating respectively with the bowl and passage of the mouthpiece, and the stem and mouthpiece being provideed between said chambers with an enlarged bore, and an insert fitting snugly in said bore with its ends in close relation to said chambers, said insert being provided in its upper and lateral sides with longitudinal grooves equal in length to the insert, said insert being provided in one end with a cross groove placing the lateral grooves in communication with each other, and said insert being provided at its other end with a cross groove placing the remaining lateral groove and said upper groove in communication with each other, and disks attached to the ends of said insert, one of the disks having a notch registering with the upper groove to place said groove in communication with the chamber of the stem, said disk cutting off communication between the remaining grooves and said chamber, and the other disk being provided with a notch registering with one of the lateral grooves to establish communication between said groove and the chamber of the mouthpiece, this disk cutting off communication between the remaining grooves and this chamber.

MAC R. WALLACE.